(12) United States Patent
Hahn

(10) Patent No.: US 9,873,571 B2
(45) Date of Patent: Jan. 23, 2018

(54) DEVICE AND METHOD FOR GROUPING CONTAINERS

(71) Applicant: KRONES AG, Neutraubling (DE)

(72) Inventor: Wolfgang Hahn, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/917,916

(22) PCT Filed: Jul. 25, 2014

(86) PCT No.: PCT/EP2014/066040
§ 371 (c)(1),
(2) Date: Mar. 9, 2016

(87) PCT Pub. No.: WO2015/036159
PCT Pub. Date: Mar. 19, 2015

(65) Prior Publication Data
US 2016/0297619 A1    Oct. 13, 2016

(30) Foreign Application Priority Data

Sep. 13, 2013 (DE) .................. 10 2013 218 397

(51) Int. Cl.
*B65G 47/26* (2006.01)
*B65G 47/08* (2006.01)
(Continued)

(52) U.S. Cl.
CPC .......... *B65G 47/082* (2013.01); *B65B 35/405* (2013.01); *B65G 47/846* (2013.01);
(Continued)

(58) Field of Classification Search
CPC .... B65G 47/08; B65G 47/082; B65G 47/846; B65G 47/847; B65G 47/848; B65B 35/40; B65B 35/405
(Continued)

(56) References Cited

U.S. PATENT DOCUMENTS 3,618,743 A    11/1971   Benatar et al.
5,718,323 A *  2/1998   Flix ...................... B65G 47/082
                                                    198/459.1
(Continued)

FOREIGN PATENT DOCUMENTS

CN         1084479 A      3/1994
CN       102177080 A      9/2011
(Continued)

OTHER PUBLICATIONS

ISA European Patent Office, International Search Report and Written Opinion Issued in Application No. PCT/EP2014/066040, dated Nov. 11, 2014, WIPO, 6 pages.

*Primary Examiner* — William R Harp
(74) *Attorney, Agent, or Firm* — McCoy Russell LLP

(57) ABSTRACT

Described are a device and a method for grouping, and in particular, for sorting out containers conveyed in a container flow. Provided for this purpose are an outlet star wheel and an immediately adjoining outlet conveyor. Because the latter comprises a plurality of separately driven vehicles with positioning elements to influence the conveying position of a container relative to the container flow, and because a conveyor section is provided for the containers along which the vehicles run during the grouping of the containers, the positioning elements can be selectively positioned in a flexible manner between individual containers in order to push the containers together into container groups.

21 Claims, 3 Drawing Sheets

(51) Int. Cl.
*B65G 54/02* (2006.01)
*B65B 35/40* (2006.01)
*B65G 47/84* (2006.01)

(52) U.S. Cl.
CPC ...... *B65G 54/02* (2013.01); *B65G 2201/0244* (2013.01); *B65G 2811/0615* (2013.01)

(58) Field of Classification Search
USPC ................................ 198/419.1, 459.1, 418.8
See application file for complete search history.

(56) References Cited

U.S. PATENT DOCUMENTS

| | | | |
|---|---|---|---|
| 6,321,896 B1 | 11/2001 | Zuccheri et al. | |
| 7,665,596 B2 * | 2/2010 | Kolbe | B30B 11/08 193/31 A |
| 7,665,598 B2 * | 2/2010 | Begin | B65G 47/082 198/419.1 |
| 7,815,034 B2 | 10/2010 | Fleck et al. | |
| 8,096,409 B2 * | 1/2012 | Wipf | B65G 19/02 198/728 |
| 8,776,985 B2 | 7/2014 | Huettner et al. | |
| 9,061,838 B2 | 6/2015 | van de Loecht et al. | |
| 9,079,724 B2 | 7/2015 | van de Loecht et al. | |
| 9,346,576 B2 * | 5/2016 | Allgaier | B65B 35/00 |
| 9,403,611 B2 * | 8/2016 | Sacchetti | B65B 35/405 |
| 2010/0084247 A1 * | 4/2010 | Wipf | B65G 19/02 198/617 |
| 2012/0261233 A1 * | 10/2012 | Huettner | B65G 54/02 198/459.1 |

FOREIGN PATENT DOCUMENTS

| | | |
|---|---|---|
| CN | 102300791 A | 12/2011 |
| CN | 102328822 A | 1/2012 |
| DE | 2358771 A1 | 6/1975 |
| DE | 4343477 C1 | 8/1995 |
| DE | 102004042474 A1 | 3/2006 |
| DE | 102006023531 A1 | 11/2007 |
| DE | 102008040204 A1 | 1/2010 |
| DE | 102011016855 A1 | 10/2012 |
| DE | 102011075176 A1 | 11/2012 |
| DE | 102011075178 A1 | 11/2012 |
| DE | 102011081705 A1 | 2/2013 |
| EP | 0994819 A1 | 4/2000 |
| EP | 2407846 A2 | 1/2012 |
| EP | 2511203 A1 | 10/2012 |
| WO | 2012150086 A1 | 11/2012 |

* cited by examiner

DEVICE AND METHOD FOR GROUPING CONTAINERS

CROSS REFERENCE TO RELATED APPLICATIONS

The present application is a U.S. National Phase of International Patent Application Serial No. PCT/EP2014/066040, entitled "APPARATUS AND METHOD FOR GROUPING CONTAINERS," filed on Jul. 25, 2014, which claims priority to German Patent Application No. 102013218397.6, entitled "APPARATUS AND METHOD FOR GROUPING CONTAINERS," filed on Sep. 13, 2013, the entire contents of each of which are hereby incorporated by reference for all purposes.

TECHNICAL FIELD

The invention relates to a device and to a method for grouping, and in particular for sorting out and/or distributing, containers conveyed in a container flow as well as to a corresponding method.

BACKGROUND AND SUMMARY

Before the packaging of filled drink containers, such as bottles, for example, these are usually conveyed in an unsorted manner in mass transport to the inlet of a packaging machine where the containers are distributed to a plurality of conveying channels by jostling and finally are supplied to the packaging machine. Alternatively, the containers can be transported in a single lane to the packaging machine and selectively distributed to a plurality of conveying channels at the machine's inlet. Containers that have been identified as defective are furthermore to be sorted out of the container flow before the packaging.

Detrimental in the unsorted mass transport of the containers is that these first have to be slowed down after the labelling and distributed to a broad container flow. This causes substantial equipment costs. The subsequent jostling of the containers into individual conveying channels is likewise expensive in terms of equipment because special railing structures are required on the conveyor devices. Furthermore detrimental is a comparatively high susceptibility to faults because the containers can become jammed during the jostling.

A single-track container transport with subsequent distribution to channels, such as is described, for example, in DE 4 343 477 C1, causes comparatively long conveyor sections and a large number of drive units, for example, in order to close gaps between individual container groups in individual conveying channels and to reduce the comparatively high inlet speed out of the single-track container transport. This causes undesirably large space requirements and equipment costs. In particular, the distribution of individual containers to conveying channels, such as described, for example, in DE 10 2006 023531 A1, causes undesirably high design costs in regard to the mechanical components and the device controller, because the containers must be moved at comparatively high speeds and with comparatively high accelerations.

Because the containers are normally freely conveyed in an upright position on a conveyor chain or the like, the diversion of defective containers is susceptible to faults, particularly in the event that individual containers have been shifted or displaced due to accelerations or decelerations of the conveyor chain.

EP 2 511 203 A1 furthermore describes a transport device with individually driven transport elements, each of which is assigned to individual containers or container assemblies and with which a stipulated transport division between the containers or container assemblies can be adapted to a subsequent handling unit. In this case, all containers or assemblies of the product flow move in the same manner.

There is consequently a need for devices and methods for grouping containers, particularly for a subsequent distribution of the containers, and/or the inclusion of a diversion function for defective containers, with which at least one of the above mentioned problems can be moderated or even remedied.

The posed object is satisfied with a device that accordingly comprises an outlet star wheel and an immediately adjoining outlet conveyor. The outlet conveyor comprises: a plurality of separately driven, particularly by linear motor drive, vehicles, to which are attached positioning elements to influence the conveying position of a container relative to the container flow; and a conveyor section for the containers along which the vehicles run during the grouping of the containers.

Due to the fact that the vehicles are separately driven, the conveying position of individual containers can be selectively changed in order to arrange the containers in groups. For this purpose, selected containers can be shifted with the positioning elements relative to the container flow in the direction of the particular assigned container group.

The influencing of the conveying position is understood to mean that the positioning elements move individual containers, relative to the incoming container flow, either in the conveying direction towards the leading container, whereby the positioning elements then act as drivers, or against the conveying direction towards the subsequent container, whereby the positioning elements then act as a mechanical limit stop. The positioning elements are in particular developed in such a way that they can contact the sidewalls of the containers in a leading or trailing manner in order selectively to decelerate or accelerate containers with respect to an average conveying speed of the container flow.

The conveyor section can, for example, comprise a conveyor belt or the like that runs at a constant speed, so that the vehicles can both conduct the containers at this speed and decelerate or accelerate the containers with regard to this speed, for example, in certain subsections of the conveyor section. The conveyor section could however also be developed by the vehicles alone, by means of the containers being held between positioning elements of vehicles arranged in pairs. The conveying position of the containers is then influenced by pair-wise deceleration or acceleration of these vehicles. This is conceivable, for example, in container transport using neck handling.

The vehicles, which can be developed, for example, as skids and/or can run on rollers and/or can run along guide rails, are preferably moved by means of a linear drive. This comprises, for example, active drive components attached along the conveyor section, like stators to generate an electromagnetic field, and passive drive components on the vehicles, such as permanent magnets or the like, for example. However the vehicles can also comprise active drive components, such as electric motors, for example. What is crucial is the individual controllability of the vehicles.

Preferably the outlet conveyor is developed in such a way that the vehicles can be selectively decelerated along the conveyor section to at least one stipulated speed. The vehicles are hereby decelerated with respect to a conveying speed stipulated by the outlet conveyor. Consequently individual containers can be selectively decelerated so that following containers run into the containers that have been decelerated in this way.

The containers can consequently be slid together into a container group solely by means of the deceleration of the front-most container. Then it is only necessary to produce the contact with an individual leading positioning element. By stipulating a certain deceleration of the front-most container and of the assigned vehicle, for example, it is possible in a simple way to adjust the number of containers that accumulate along a certain length of the conveyor section. The more strongly the leading vehicle is decelerated, the more containers will accumulate into a container group. With a trailing positioning element, the container group could then additionally be pressed together.

The outlet conveyor is preferably developed in such a way that the vehicles drive to the outlet star wheel independently of one another and, with the positioning elements, engage in the container flow before and/or after an individually selectable sequence of containers. This is to be understood to mean that, for example, a first positioning element engages in a leading manner in front of the first container of a container group that is to be formed. It is furthermore conceivable that a second positioning element engages in a trailing manner behind the last container of the container group that is to be formed. Likewise a first positioning element can engage in a leading manner in front of a container that is to be sorted out of the container flow and a second positioning element can engage behind the container that is to be sorted out.

The selective engagement of the positioning elements in the container flow can, for example, be triggered by control signals that indicate the beginning and/or the end of a container group that is to be formed or that identify a container that is to be sorted out. The vehicles can consequently be driven as needed to the outlet star wheel in order to take over the containers or container groups at stipulated positions within the container flow.

The number of containers in individual container groups can consequently be flexibly adjusted. Individual containers can likewise selectively be assigned to a certain container group or sorted out of the container flow.

The device according to the invention preferably comprises a distributing device in order to distribute container groups formed in the outlet conveyor to at least two conveying channels. For example, following the conveyor section, a distribution section can be developed, along which the container groups are further conveyed while however no longer being conducted by the positioning elements.

For example, the distribution section can be developed in a straight-line continuation of the conveyor section, in particular as a continuous conveyor device, such as, for example, a continuous conveyor belt or the like. The positioning elements release the containers, for example, in that the vehicles turn off in front of the distribution section on to a separate track. It would likewise be possible to move the positioning elements relative to the vehicles and thereby swivel them out or pull them back from the container flow.

The distributing device preferably comprises diverting flaps and is developed in such a way that the diverting flaps engage in each of the gaps between the container groups that have been formed. These gaps are created when the containers are pushed together into container groups. It is therefore not necessary to change the overall transport division of the container flow in order to form suitable gaps for the distribution of the container groups to transport channels. In particular, the container groups can then be comparatively simply and reliably distributed to subsequent conveying channels by using conventional diverting flaps.

The outlet conveyor furthermore preferably comprises a return track to conduct the vehicles back to the outlet star wheel. The vehicles can then be parked in a waiting position in front of the outlet star wheel. From there the vehicles can be driven to the outlet star wheel as needed, so that the positioning elements engage at stipulated positions within the container flow and take over the containers or container groups. The vehicles are preferably conducted back on the return track more quickly than they run along the conveyor section during the grouping of the containers. In this way, it is possible to minimise the number of total vehicles needed.

Preferably at least one diversion area for containers to be sorted out of the container flow is developed on the return track. Containers that are to be sorted out can consequently be selectively conducted between two vehicles to the diversion area. A plurality of diversion areas with assigned collection containers or the like can be provided. For example, the containers are released in the diversion area by the assigned positioning elements and are allowed to fall into a collection container. The diversion area can be arranged in a space-saving manner on the return track.

The outlet conveyor preferably comprises at least one conveyor belt, that can, for example, be developed as a conveyor chain or the like and on which the containers stand during the grouping. The conveyor belt then runs, for example, at a constant conveying speed, in particular at the conveying speed of the outlet star wheel. With the help of the positioning elements, the containers can be shifted on the conveyor belt in an upright position. After this, the container groups are further transported on the conveyor belt in an upright position. Preferably there is also at least one conveyor belt in the area of the distribution section and/or in a conveying area up to the diversion area.

With conveyor belts of that kind, the containers can be supported from below while being conveyed. The containers can thereby be actively conducted with the help of the positioning elements. In the area of the distribution section, the containers are preferably not conducted by the positioning elements.

The positioning elements preferably comprise centring sections that centre the containers during the influencing of their conveying position at a right angle to the container flow. This is to be understood to mean that the containers are centred with respect to one another by a force exerted in the lateral direction on the containers by the positioning elements in the conveying direction or counter to the conveying direction. The centring sections can be developed, for example, as prism-shaped slots in the positioning elements in the top view or as the negative of a container outer wall or the like.

The posed object is likewise satisfied with a method with the use of the device according to the invention. The method according to the invention accordingly comprises a step in which at least a first container of a container group that is to be formed is contacted in a leading manner with one of the positioning elements and the associated vehicle is decelerated in such a way that the containers of the container group run into one another.

For example, the leading positioning element is decelerated with respect to the average speed of the overall container flow and/or of an assigned conveyor belt, so that the containers initially following at the average speed of the container flow one after the other run into the particular leading, decelerated container. Consequently a single leading positioning element is sufficient in order to form a container group.

Depending on the degree of the deceleration of the leading positioning element, various numbers of containers run together along a stipulated conveyor section into a container group. The gap between individual container groups is then formed in that the leading positioning element assigned to the following container group is likewise decelerated.

Furthermore, preferably the last container of the container group that is to be formed is contacted in a trailing manner with a positioning element in such a way that the containers of the container group are slid together and in particular are squeezed. This allows a particularly stable, active conducting of the formed container group between the leading positioning element and the trailing positioning element. The container group can thereby be conducted laterally, for example, by means of guide rails or the like.

Containers that are to be sorted out of the container flow are preferably squeezed between leading and trailing positioning elements and are conducted by the associated vehicles into a diversion area. The positioning elements can consequently be used both for the grouping of containers and for the diversion of containers. Because the containers are squeezed between the assigned positioning elements, the containers with the vehicles can be laterally diverted from the conveyor section and conducted to the diversion area.

A conveyor clearance, stipulated by the outlet star wheel, between the containers is preferably reduced within the formed container groups and simultaneously enlarged between the container groups. The conveying speed of the overall container flow can consequently remain unchanged. The containers are preferably slid together in contact with one another during the grouping. The gaps between adjacent container groups are preferably enlarged to a corresponding degree. The gaps between individual container groups can, however, be additionally enlarged due to the sorting out of individual containers. In any case, sufficiently large gaps can be formed between the individual container groups in a particularly simple way in order to distribute the container groups subsequently to a plurality of channels.

The containers are preferably distributed in groups to conveying channels that are connected in parallel. In this way, the container flow can be simply and uniformly divided into a plurality of parallel container flows for the subsequent packaging of the containers.

Preferably the absence of the containers sorted out of the container flow is compensated by adjusting the size of the formed container groups and/or by a weighted distribution of the formed container groups to the conveying channels in order to uniformly distribute the number of conveyed containers to the conveying channels.

For example, when at least one container is sorted out of a container group, the number of containers in the container groups subsequently conducted to the same conveying channel can be correspondingly increased. Likewise the container groups conducted in the other conveying channels could be correspondingly reduced. It would also be conceivable to register the number of containers missing in the individual conveying channels due to being sorted out and when needed to conduct additional container groups with suitable group sizes to a particular conveying channel. The conveying channels consequently can be supplied in parallel with homogenous container flows within a stipulated tolerance.

BRIEF DESCRIPTION OF THE FIGURES

Preferred embodiments of the device according to the invention are depicted in the drawing. Shown are.

DETAILED DESCRIPTION

Figure 1:
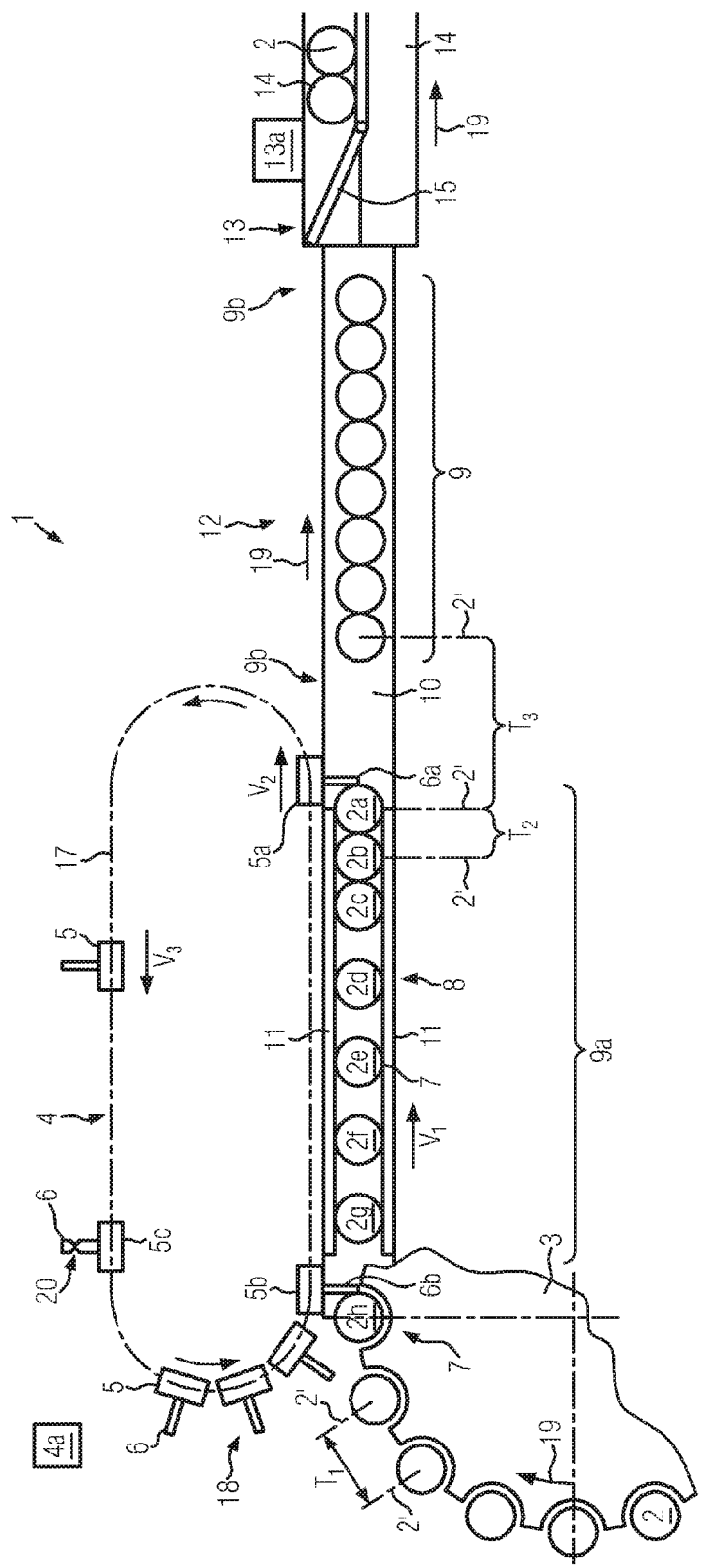
FIG. 1 A schematic top view onto a first embodiment of the device according to the invention.

As can be seen in FIG. 1, a first embodiment 1 of the device according to the invention for grouping containers 2, such as bottles or the like, for example, comprises an outlet star wheel 3 that provides the containers 2 as a continuous container flow with a transport division T1. Immediately adjoining the outlet star wheel 3 is an outlet conveyor 4 with vehicles 5, driven independently of one another, whereby attached to each are positioning elements 6 for the containers 2. Developed between the outlet star wheel 3 and the outlet conveyor 4 is a transfer area 7 in which the containers 2 are taken over by the outlet conveyor 4. Developed on the outlet conveyor 4 following the transfer area 7 is preferably a straight-line conveyor section 8, along which the containers 2 are combined into container groups 9. A number of containers 2a-2g to be grouped stand in the shown example on a schematically indicated conveyor belt 10, which can, for example, be developed as a transport chain or the like.

The containers 2 are delivered by the outlet star wheel 3 at a speed V1. The conveyor belt 10 preferably runs at the same speed V1. With the help of a leading vehicle 5a and the associated positioning element 6a, the front-most container 2a of a container group 9a to be formed is decelerated to a speed V2. Each of the following containers 2b-2g of the container group 9a to be formed runs at speed V1 into the particular leading container in front of it. Finally the containers 2a-2g of the container group 9a are in contact with one another. During grouping, the containers 2a-2g can be conducted, for example, with the help of lateral guide rails 11 or the like.

The grouping of the containers 2a-2g causes the transport division T1 to be reduced to a value T2 between the containers 2a-2g of the container group 9a to be formed and thereby to be increased to a value T3 between the formed container groups 9. As schematically indicated in FIG. 1, the transport division T2 between the containers 2 of the formed container group 9 and the transport division T3 between formed container groups 9 is maintained on a distribution section 12 following the conveyor section 8. The transport division is the particular clearance between the conveyer positions 2' in the conveyor flow of adjacent containers 2.

Developed downstream of the outlet conveyor 4 is a distributing device 13 with which the formed container groups 9 can be distributed to conveying channels 14 that are connected in parallel. For this purpose, the distributing device 13 comprises, for example, at least one diverting flap 15 or the like, indicated only schematically. The principal function of switches of that kind is known. The distributing device 13 is, for example, switchable with the help of a control device 13a in such a way that a diverting flap 15 engages in each of the gaps 9b formed between the container groups 9 in order to conduct the formed container groups 9 to one of the conveying channels 14.

As is furthermore schematically indicated in FIG. 1, the outlet conveyor 4 preferably comprises a return track 17 for the vehicles 5, along which these run back to the outlet star wheel 3. The vehicles 5 are preferably parked in a waiting area 18 in front of the outlet star wheel 3 and can be selectively driven from there into the transfer area 7. The vehicles 5 preferably run in this synchronised with the outlet star wheel 3 in such a way that the positioning elements 6 engage in a leading or trailing manner in the container flow and take over the containers 2 in the transfer area 7 for the subsequent conveying and grouping. In FIG. 1, this is shown by way of example for vehicle 5*b*, which engages in a leading manner before the first container 2*h* of a subsequent container group.

Alternatively, the vehicle 5*b* can engage in the container flow in such a way that it touches the last container 2*g* of the container group 9*a* that is to be formed and conducts or pushes this in the direction of the leading containers 2*a*-2*f*. In this case, the containers 2*a*-2*g* of the container group 9*a* that is to be formed could be squeezed or held between the leading vehicle 5*a* with its positioning element 6*a* and the trailing vehicle 5*b* with its positioning element 6*b*. This is not shown in FIG. 1 for the sake of clarity.

The vehicles 5 run back on the return track 17 preferably at a higher speed V3 than during grouping along the conveyor section 8, represented by way of example by the speeds V1 and V2. Consequently only relatively few vehicles 5 are needed in order to guarantee continuously circulating operation of the vehicles 5 with a sufficient number of vehicles 5 parked in the waiting area 18.

The positioning elements 6 can be developed centred at a right angle to the conveying direction 19 of the container flow. For this purpose, the positioning elements 6 comprise, for example, contoured centring sections 20 in the form of notches, prism-shaped in the top view, or other concave and/or convex formations. This is indicated only schematically in FIG. 1 for a vehicle 5*c* running on the return track 17.

Serving the separate driving of the vehicles 5 is, for example, a control unit 4*a* that drives the vehicles 5 synchronised with the container flow that is to be grouped into the transfer area 7 and that brings about suitable speed changes in the vehicles 5 along the conveyor section 8. Different speed profiles or the like can, for example, be stored for this for the grouping and/or the sorting out of containers 2.

The drive of the individual vehicles 5 preferably takes place by means of a linear drive that, in a manner that is known in principle, can comprise linear motors (not shown) arranged in a stationary manner along the conveyor section 8 and the return track 17 as well as associated passive drive components in the vehicles 5, for example, permanent magnets (not shown). Linear motors can, for example, be integrated into stationary guide elements as guide rails and/or guide rails for the vehicles 5 and can generate suitable magnetic fields or the like for driving the vehicles. Crucial hereby is that the drive of the individual vehicles 5 can be individually controlled with the control unit 4*a*.

Figure 2:
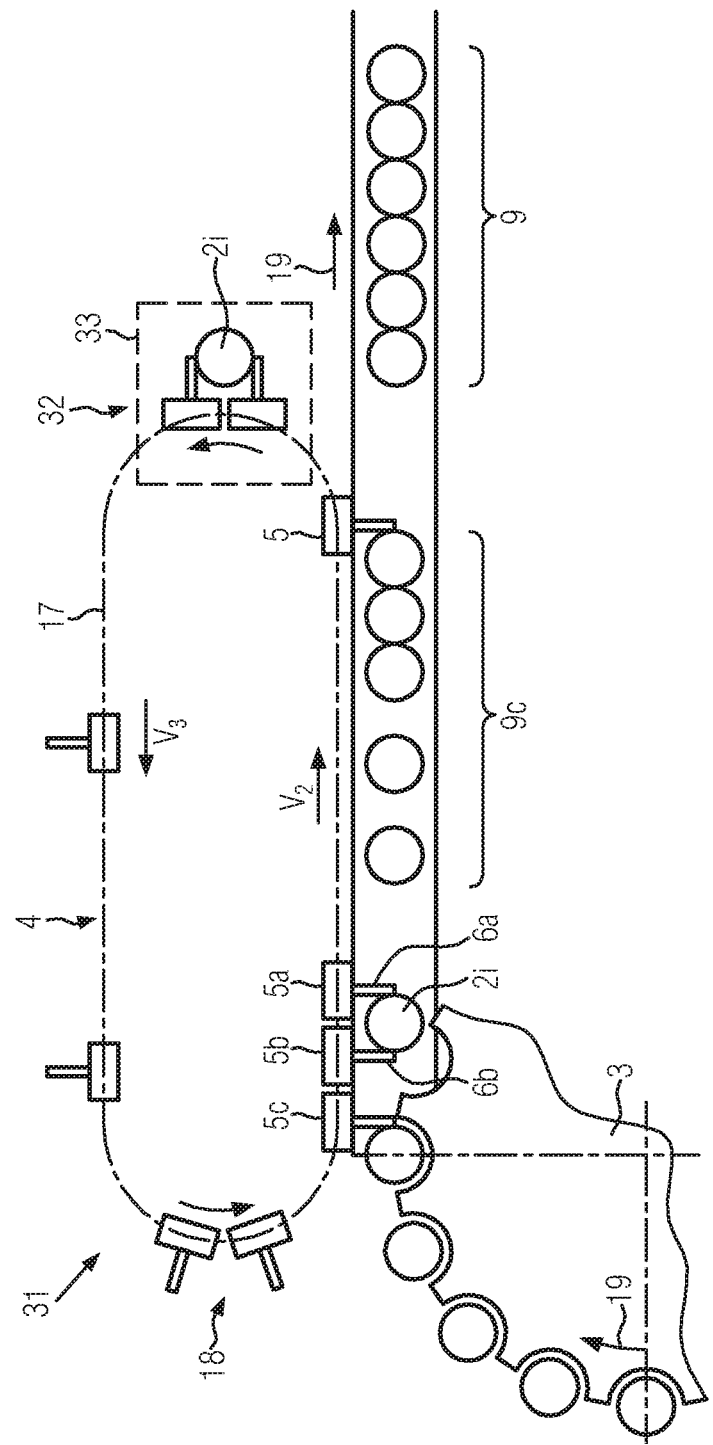
FIG. 2 A schematic top view onto a second preferred embodiment.

Shown in FIG. 2 is a second preferred embodiment 31 that differs from the first embodiment 1 essentially only in the fact that a diversion area 32 is provided on the return track 17. As shown by way of example in FIG. 2, individual containers 2*i* that are to be sorted out of the container flow can be squeezed or held between the positioning element 6*a* of a leading vehicle 5*a* and the positioning element 6*b* of a trailing vehicle 5*b* and conducted as far as the diversion area 32. Provided in this area is, for example, a schematically indicated collection container 33 for containers 2*i* that have been sorted out, whereby these containers that have been sorted out can be allowed to fall into said collection container by the positioning elements 6*a*, 6*b*. For this purpose, the vehicles 5*a*, 5*b* can be driven apart from each other. It is also possible for a plurality of diversion areas 32 of this kind to be developed one behind another on the return track 17 so that a collection container 33 that is ready to receive can always be held available.

As can be seen schematically in FIG. 2, the container 2*i* that is to be diverted belongs to a container group 9*c* that is to be formed, in which the number of containers is reduced with respect to a leading, already formed container group 9 by the container 2*i* that is to be sorted out. The next container group then begins, for example, behind an immediately following vehicle 5*c*.

The container groups 9, 9*c* can be distributed to the subsequent conveying channels 14 in the manner previously described. The absence of diverted containers 2*i* in individual container groups 9*c* can be compensated, for example, by having that conveying channel 14 into which the container group 9*c* with a reduced number of containers was introduced subsequently supplied with a container group with a correspondingly higher number of containers. It would likewise be conceivable in a subsequent distribution process to reduce the size of each of the container groups that are conducted into the remaining conveying channels 14 by one container 2.

It would also be conceivable to correct the distribution of the containers 2 to the individual conveying channels 14 by waiting to conduct a container group 9 with a nominal number of containers additionally into one of the conveying channels 14 until the number of containers of a nominal container group 9 in this conveying channel 14 is absent. For this purpose, the grouping and the diversion of individual containers could be logged in the control unit 4*a* or 13*a* and the distributing device 13 could then be appropriately activated as needed. The distributing device 13 is not shown in FIG. 2 for the sake of simplicity.

Figure 3:
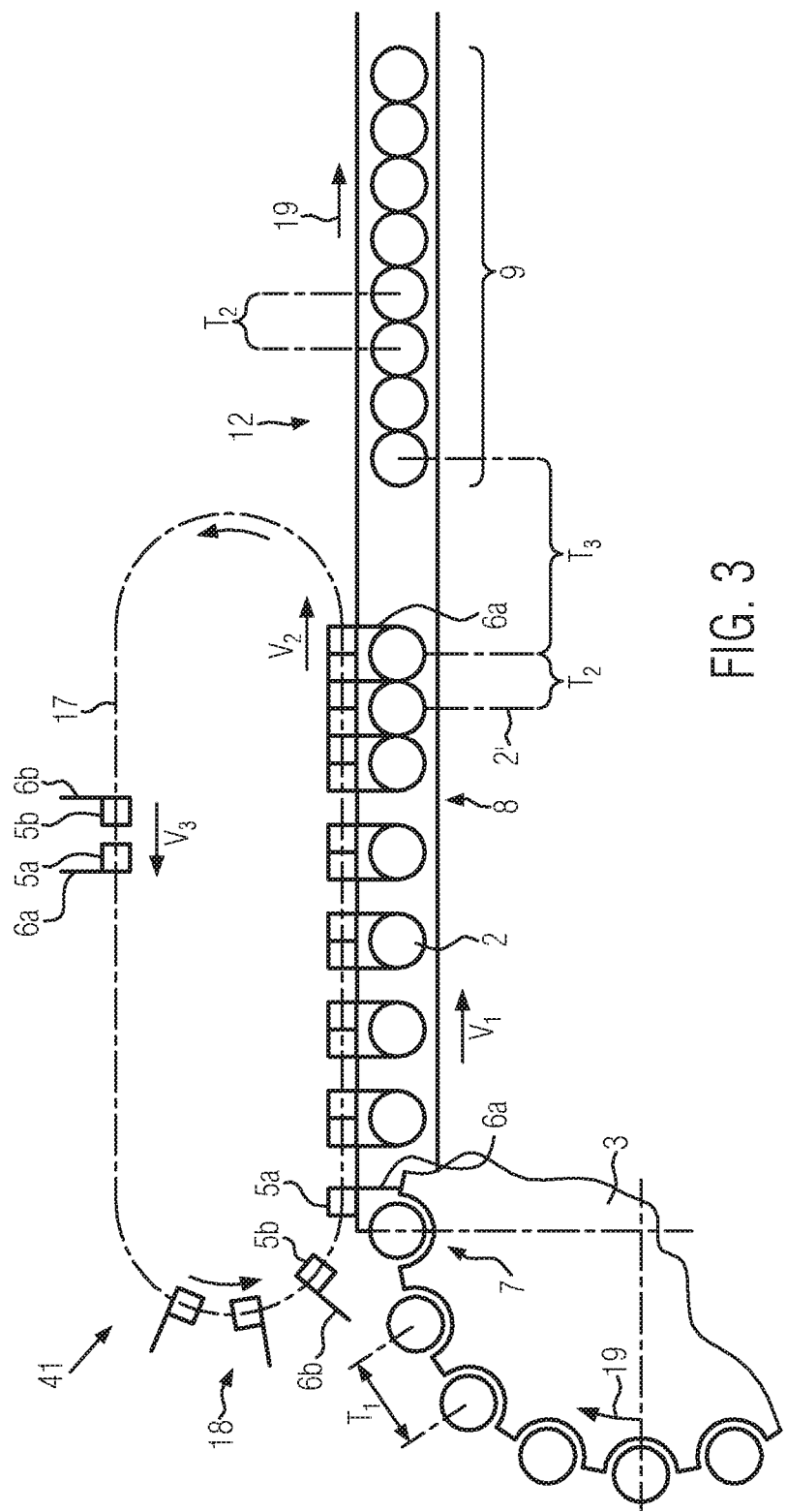
FIG. 3 A schematic top view onto a third preferred embodiment.

FIG. 3 shows a third preferred embodiment 41 that differs from the previously described embodiments essentially in that there are always two vehicles 5*a*, 5*b* and their positioning elements 6*a*, 6*b* that work together in pairs in a leading and trailing manner. In this case, one container 2 is held or squeezed by a pair of vehicles 5 and positioning elements 6. In FIG. 3, the associated conveyor devices and distribution devices, which can per se correspond to the previously described embodiments, are not shown in the interest of simplicity.

When the vehicles 5 work together in pairs, the positioning elements 6 are preferably developed in such a manner that the vehicles 5 and the positioning elements 6 can be driven together without any gaps. It is then possible to create a reduction, schematically shown in FIG. 3, in the inlet side transport division T1 to the transport division T2 between the grouped containers 2 of a common container group 9. Then a leading vehicle 5*a* and a trailing vehicle 5*b* are driven, in synchronisation with the movement of the outlet star wheel 3, into the transfer area 7 and the associated container 2 is squeezed or held between the assigned positioning elements 6*a* and 6*b*. After leaving the transfer area 7, the vehicles 5*a* and 5*b* are then decelerated as a pair from the first conveying speed V1 to a second conveying speed V2. The containers 2 of a common container group 9 are then held and grouped by two vehicles 5*a*, 5*b* and the associated positioning elements 6*a*, 6*b*.

At the end of the conveyor section 8 the grouped containers 2 are released by the respective vehicles 5*a*, 5*b* and/or the associated positioning elements 6*a*, 6*b*. For example, the vehicles 5a, 5b can be conducted along the return track 17 away from the conveyor section 8 and the subsequent distribution section 12. Additionally or alternatively, the positioning elements 6a, 6b can be swung away or pulled back from the containers 2 in order to release the containers 2 at the end of the conveyor section 8.

The subsequent distribution of the container groups 9 to the subsequent conveying channels 14 can then take place in the manner described above. Likewise, each container 2i that is to be sorted out can be conducted by a pair of vehicles 5a, 5b up to a diversion area 32 provided on the return track 17 and there diverted from the container flow in the described manner.

In particular in the case of vehicles 5a, 5b that work together in pairs the containers 2 can also be held by the positioning elements 6a, 6b without lower support with a conveyor belt 10 or the like. In principle, for example, the delivery and the grouping of the containers 2 would then also be conceivable in neck handling. On the distribution section 12 and for the distribution and removal in the conveying channels, however, upright conveyance of the container groups 9 on a conveyor belt 10 or the like is advantageous.

The outlet star wheel 3 can have a conventional design and be a conventional component of a labelling machine or the like. Consequently the device according to the invention and the corresponding method for the grouping, sorting out and/or distribution of containers 2 can be flexibly adjusted to the outlet star wheel of virtually any handling systems. The vehicles 5 with individual drive required for this and the associated guide elements for the vehicles, such as rails or the like, for example, are known per se and therefore are not explained in more detail.

The driving of the individual vehicles 5 is brought about, for example on the basis of previous acquired inspection results, with the help of which containers 2i that are to be sorted out can be identified in the product flow. Then, for example, suitable control signals are communicated to the control unit 4a, which then drives a leading vehicle 5a and a trailing vehicle 5b into the transfer area 7 in order to drive the container that is to be sorted out into the diversion area 32.

The positioning elements 6a, 6b can be developed both for non-positive and positive locking holding of the containers 2. The positioning elements 6 can preferably exert a vertical holding force on the containers 2 that is sufficiently strong to conduct containers 2i that are to be sorted out into the diversion area 32 even without support from below by squeezing them between the positioning elements 6.

By means of a suitable variation of the speed V2 when decelerating the containers 2, it is possible in an easy way to select how many containers 2 run into one another along the conveyor section 8, and likewise the size of the gap 9b that this results in between two successive container groups 9. The grouping of the containers 2 can additionally be flexibly fashioned by using trailing vehicles 5b with the associated positioning elements 6b to push together or squeeze the container groups 9. To achieve this, it is only necessary to ensure a sufficient number of vehicles 5 in the waiting area 18.

The described device allows an especially compact and flexible grouping of containers 2 with an essentially unchanged conveying speed of the container flow. The gaps 9b needed for the subsequent distribution of the container groups 9 for the engagement of diverting flaps 15 or the like result as a side-effect when the individual containers 2 are pushed together to form container groups 9.

For this purpose comparatively low relative speed differences, for example, between the speeds V1 and V2, are needed, so that the design of the device for the grouping, sorting out and distribution of the containers 2 on the basis of low decelerations of the containers 2 is simplified. The absence of individual containers 2i that have been sorted out in the container groups 9' distributed to the conveyor belts 14 can be compensated in a flexible manner during the grouping of the containers 2 and/or during the distribution of the container groups 9, 9c. Consequently the container flow can be essentially uniformly distributed to the subsequent conveying channels 14 and fed to the subsequent packaging machines or the like (not shown) with uniform utilization.

The invention claimed is:

1. A device for grouping containers conveyed in a container flow with an outlet star wheel and with an immediately adjoining outlet conveyor, comprising:
   a plurality of separately driven vehicles, to which are attached positioning elements to influence a conveying position of a container relative to the container flow; and
   a conveyor section for the containers along which the vehicles run during the grouping of the containers, wherein the outlet conveyor selectively decelerates the vehicles along the conveyer section to at least one stipulated speed and a conveyor clearance stipulated by the outlet star wheel is reduced between containers within formed container groups and simultaneously enlarged between the formed container groups.

2. The device according to claim 1, wherein the outlet conveyor drives the vehicles independently of one another to the outlet star wheel and, with the positioning elements, engages the vehicles into the container flow before and/or after an individually selectable sequence of containers.

3. The device according to claim 1, further comprising a distributing device in order to distribute container groups formed in the outlet conveyor to at least two conveying channels.

4. The device according to claim 3, wherein the distributing device comprises at least one diverting flap that engages in each gap between the formed container groups.

5. The device according to claim 1, wherein the outlet conveyor further comprises a return track to return the vehicles to the outlet star wheel.

6. The device according to claim 5, wherein developed on the return track is at least one diversion area for containers to be sorted out from the container flow.

7. The device according to claim 1, wherein the outlet conveyor comprises at least one conveyor belt on which the containers stand during the grouping.

8. The device according to claim 1, wherein the positioning elements comprise centering sections that center the containers at a right angle to the container flow during the influencing of their conveying position.

9. The device according to claim 1, wherein the device further sorts out and/or distributes the containers.

10. The device according to claim 1, wherein the plurality of separately driven vehicles is driven by linear motor drives.

11. The device according to claim 1, wherein the device is for sorting out and/or distributing containers conveyed in the container flow.

12. A method for grouping and/or sorting out containers conveyed in a container flow with a device, comprising:
   contacting at least a first container of a container group that is to be formed in front with a leading positioning element;

decelerating a vehicle of the leading position element; and running the containers of the container group into one another, where the device includes an outlet star wheel and an outlet conveyor immediately adjoining the outlet star wheel, and wherein a conveyor clearance stipulated by the outlet start wheel is reduced between containers within formed container groups and simultaneously enlarged between the formed container groups.

13. The method according to claim 12, wherein a last container of the container group that is to be formed is contacted from behind with a trailing positioning element, and wherein the containers of the container group are slid together.

14. The method according to claim 12, wherein containers that are sorted out of the container flow are squeezed between the leading positioning element and a trailing positioning element and are conducted by the vehicle of the leading positioning element and a vehicle of the trailing positioning element into a diversion area.

15. The method of claim 14, wherein the containers of the container group are further squeezed together.

16. The method according to claim 12, wherein the containers are distributed in groups to conveying channels that are connected in parallel.

17. The method according to claim 16, wherein an absence of the containers due to the containers being sorted out of the container flow is compensated for by adjusting a size of the formed container groups and/or by a weighted distribution of the formed container groups to the conveying channels in order to uniformly distribute a total number of conveyed containers to the conveying channels.

18. The method according to claim 12, wherein the containers are bottles.

19. A device for grouping containers conveyed in a container flow with an outlet star wheel and with an immediately adjoining outlet conveyor, comprising:

a plurality of separately driven vehicles, to which are attached positioning elements to influence a conveying position of a container relative to the container flow; and a conveyor section for the containers along which the vehicles run during the grouping of the containers, wherein the outlet conveyor further comprises a return track to return the vehicles to the outlet star wheel, and wherein developed on the return track is at least one diversion area for containers to be sorted out from the container flow.

20. A method for grouping and/or sorting out containers conveyed in a container flow with a device, comprising:

contacting at least a first container of a container group that is to be formed in front with a leading positioning element;

decelerating a vehicle of the leading position element; and running the containers of the container group into one another, where the device includes an outlet star wheel and an outlet conveyor immediately adjoining the outlet star wheel, wherein containers that are sorted out of the container flow are squeezed between the leading positioning element and a trailing positioning element and are conducted by the vehicle of the leading positioning element and a vehicle of the trailing positioning element into a diversion area.

21. A method for grouping and/or sorting out containers conveyed in a container flow with a device, comprising:

contacting at least a first container of a container group that is to be formed in front with a leading positioning element;

decelerating a vehicle of the leading position element; and running the containers of the container group into one another, where the device includes an outlet star wheel and an outlet conveyor immediately adjoining the outlet star wheel, wherein the containers are distributed in groups to conveying channels that are connected in parallel, and wherein an absence of the containers due to the containers being sorted out of the container flow is compensated for by adjusting a size of the formed container groups and/or by a weighted distribution of the formed container groups to the conveying channels in order to uniformly distribute a total number of conveyed containers to the conveying channels.

* * * * *